United States Patent [19]
Goforth

[11] 3,813,808
[45] June 4, 1974

[54] FISHHOOK

[76] Inventor: David L. Goforth, 613 Kemp Rd. W., Greensboro, N.C. 27410

[22] Filed: Mar. 9, 1973

[21] Appl. No.: 339,571

[52] U.S. Cl. .............................................. 43/43.2
[51] Int. Cl. ............................................ A01k 83/00
[58] Field of Search ............. 43/43.2, 44.2, 44.8, 43

[56] References Cited
UNITED STATES PATENTS

| | | | |
|---|---|---|---|
| 1,820,887 | 8/1931 | Pflueger | 43/44.8 |
| 2,938,295 | 5/1960 | Watson | 43/43.2 |
| 3,026,647 | 3/1962 | Rainey | 43/44.4 |
| 3,197,911 | 8/1965 | Rolfsness et al. | 43/44.2 |
| 3,400,483 | 9/1968 | Temple | 43/44.6 |

*Primary Examiner*—G. E. McNeill

[57] ABSTRACT

A fishhook including an elongated shank having one end section terminating in an eyelet and the opposite end section terminating in a hook bill and barb. The end sections are integral with an intermediate section which has a generally S-shaped configuration for supporting bait forwardly of the hook bill and barb.

7 Claims, 7 Drawing Figures

PATENTED JUN 4 1974

3,813,808

FISHHOOK

BRIEF SUMMARY AND OBJECTS OF THE INVENTION

This invention relates generally to fishing apparatus and more particularly to a fishhook adapted to engage and retain bait upon the shank portion.

Briefly, the fishhook includes a first section including a hook bill and barb and a second section including a line attaching eyelet which are integral with a central or intermediate section. The central section is generally S-shaped defining a U-shaped portion for attaching bait thereto to locate at least a substantial portion of the bait forwardly of the hook bill.

One of the primary objects of the invention is the provision of a new and improved fishhook.

Another object of the invention is the provision of a fishhook having an improved means for attaching bait thereto at a position forwardly of the hook bill and barb.

Other objects and advantages of the invention will become apparent when considered in view of the following detailed description.

DETAILED DESCRIPTION OF THE INVENTION

Figure 2:
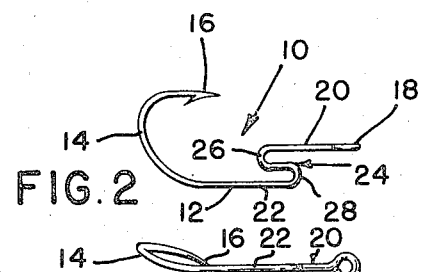
FIG. 2 is a side elevational view of the fishhook of FIG. 1.
Figure 1:
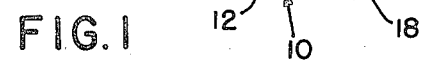
FIG. 1 is a bottom plan view of a fishhook of one embodiment of this invention.

Referring now to the drawing and particularly to FIGS. 1 and 2, the numeral 10 designates an improved fishhook having a shank portion 12 provided with a twisted, offset hook bill 14 which terminates in a barb 16 at one end and in an eyelet 18 at the opposite end. The shank 12 is provided with a first section 20 and a second section 22 interconnected by an intermediate section 24. While all three shank sections lie generally within a common plane, the intermediate section maintains the first and second sections in spaced, generally parallel relation. The intermediate section 24 serves to retain fish bait upon the hook. In the preferred embodiment, the intermediate portion is generally S-shaped defining an upper U-shaped portion 26 opening towards the eyelet 18 and a lower U-shaped portion 28 opening toward said hook bill 14.

Figure 6:
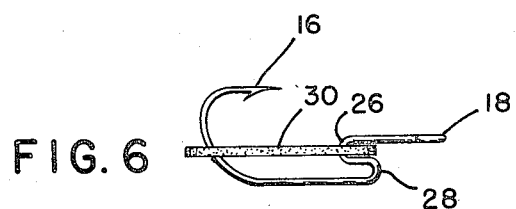
FIG. 6 is a side elevational view of the hook and bait of FIG. 5.
Figure 5:
FIG. 5 is a bottom plan view of the fishhook of FIG. 1 having bait attached thereto.

FIGS. 5 and 6 illustrate the fishhook 10 having bait 30 attached thereto and retained within the U-shaped portion 26 of the shank intermediate section 24. The bait, which may be pork rind, cut bait, etc., is pierced by the barb 16 and displaced along the hook bill and shank to the position shown by FIGS. 5 and 6. By positioning the bait 30 in this manner, a substantial portion thereof is positioned forwardly of the hook bill and barb. However, if desired, the bait may be retained by the hook bill 14 in a conventional manner with a substantial portion trailing behind the hook as the hook travels through the water.

The hook 10 normally rides in an upright position, as shown by FIGS. 2, 4, 6 and 7. Therefore, the U-shaped portion 28 serves to deflect the hook away from underwater obstacles as the portion 28 engages such objects during movement of the hook through the water.

Figure 4:
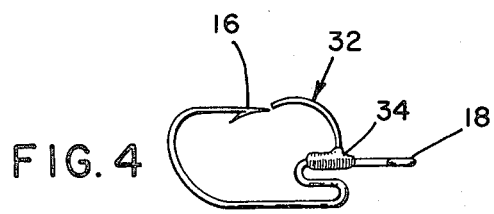
FIG. 4 is a side elevational view of the modified fishhook of FIG. 3.
Figure 3:
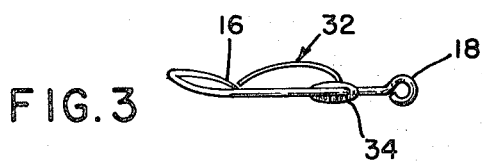
FIG. 3 is a bottom plan view of a modified embodiment of the fishhook of this invention.

Referring to FIGS. 3 and 4, the fishhook also may be provided with a deflector finger 32 of the type disclosed in U.S. Pat. application Ser. No. 269,486, filed July 6, 1972.

The finger 32 preferably is formed of a single length of thermoplastic material secured by a series of windings about the shank 12. The finger extends outwardly from the shank and rearwardly towards the barb 16 in a continuous, gentle curve. The curve may be retained by heat setting the thermoplastic material. Due to the angle of the finger 32 the fishhook functions similar to an auger or corkscrew by sliding, twisting, and crawling over, around and through obstacles by rotating or turning the barb 16 away from the obstacles as the hook is drawn through the water.

A suitable coating 34 of waterproof material protects the windings and retains the finger 32 in position with respect to the hook bill. The waterproof covering 34 may be formed of various sizes, colors and configurations to resemble an insect.

Figure 7:
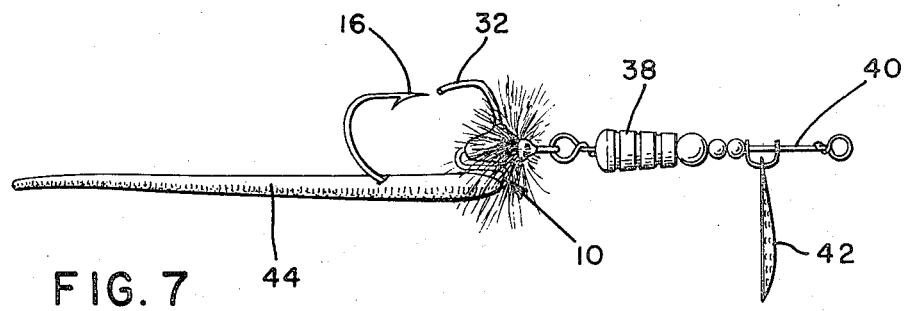
FIG. 7 is a side elevational view of a modified embodiment of the fishhook in combination with an artificial lure having a spinner and camouflaging bristles.

FIG. 7 illustrates the fishhook 10 of the invention in combination with a weight 38 and shaft 48 having a spinner 42 mounted for rotation thereon. Feathers, bristles, etc. are retained upon the shank for at least partially camouflaging the finger 32 in barb 16. As illustrated, a worm-like member 44 is attached to the hook in a conventional manner. However, the fishhook 10 permits the worm 44 to be replaced by various types of bait secured to the shank 12 in a manner substantially shown by FIGS. 5 and 6.

I claim:

1. A fishhook comprising a shank means, said shank means including a first section terminating in an eyelet, a second section terminating in a twisted, offset hook bill and barb, said first and second sections intermediate the hook bill and barb being in spaced, substantially parallel relation, and an intermediate section interconnecting said first and said second sections, said first and second sections intermediate said eyelet and said hook bill and barb and said intermediate section lying generally within a common plane, said intermediate section defining a U-shaped portion for attaching fish bait thereto forwardly of said hook bill and barb.

2. A fishhook as recited in claim 1, wherein said intermediate section is substantially S-shaped.

3. A fishhook as recited in claim 2, wherein said first and second shank sections are maintained in spaced, substantially parallel relation with respect to each other by said intermediate section.

4. A fishhook as recited in claim 3, wherein said first and second sections and said intermediate section are of integral construction.

5. A fishhook as recited in claim 1, wherein said intermediate section includes a curved portion for deflecting the fishhook away from underwater objects when the hook is drawn through the water.

6. A fishhook as recited in claim 1, and further including a deflector finger secured to said shank and extending towards said barb.

7. A fishhook as recited in claim 6, wherein said deflector finger is formed of thermoplastic material and extends in a continuous curve from said shank towards said hook bill.

* * * * *